July 3, 1923.

G. A. BOYER

GREASE RETAINER FOR JOURNAL BEARINGS

Filed Jan. 9, 1922

1,460,939

INVENTOR.
GEORGE A. BOYER.
By A. K. Martell ATTY

Patented July 3, 1923.

1,460,939

UNITED STATES PATENT OFFICE.

GEORGE A. BOYER, OF LOS ANGELES, CALIFORNIA, ASSIGNOR OF ONE-HALF TO MINTA I. HERON AND ONE-HALF TO NORMAN C. HERON, BOTH OF LOS ANGELES, CALIFORNIA.

GREASE RETAINER FOR JOURNAL BEARINGS.

Application filed January 9, 1922. Serial No. 528,064.

*To all whom it may concern:*

Be it known that I, GEORGE A. BOYER, a citizen of the United States, residing at Los Angeles, in the county of Los Angeles and State of California, have invented new and useful Improvements in Grease Retainers for Journal Bearings, of which the following is a specification.

My invention relates to a grease retainer for the bearings for shafts, spindles and the like, the principal objects of my invention being to provide a relatively simple and practical device that may be easily and cheaply produced and which will be highly effective in retaining grease or semi-liquid lubricant in the bearings of shafts and spindles; further to provide a device of the character referred to that will automatically adjust itself to the shaft or spindle to which it is applied and further, to provide a grease retainer that may be easily and quickly applied for use upon a shaft or spindle and the journal bearing therefor.

Other objects and advantages will appear hereinafter and while I have shown and will describe a preferred form of construction, I desire to be understood that I do not limit myself to such preferred form but that various changes and adaptations may be made therein without departing from the spirit of my invention as hereinafter claimed.

In the accompanying drawing Fig. 1 is an elevational view of a grease retaining device of my improved construction.

Figure 1:
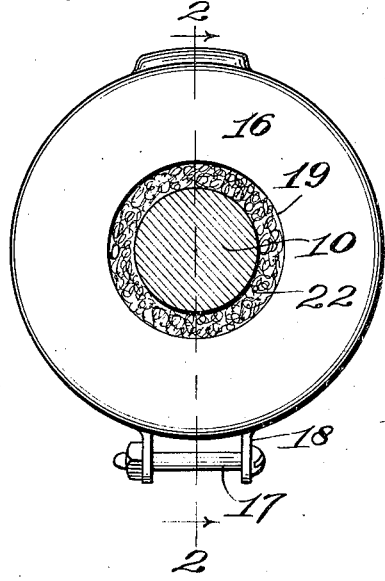
Figure 2:
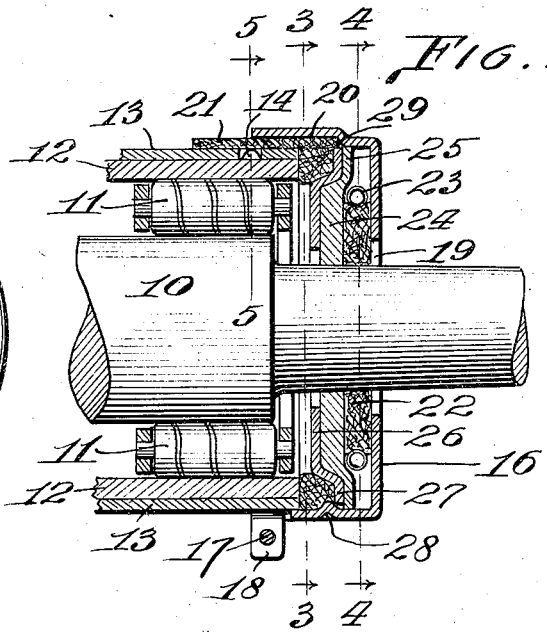
Fig. 2 is a section on the line 2—2 of Fig. 1.
Figure 3:
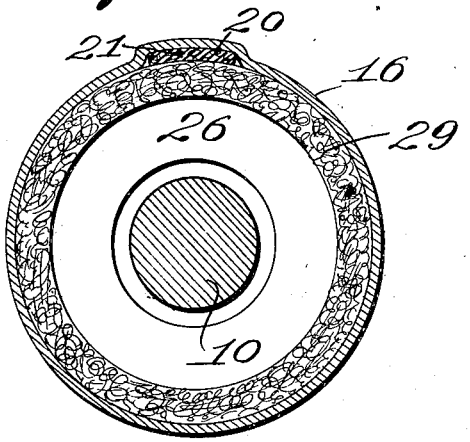
Fig. 3 is a cross section taken on the line 3—3 of Fig. 2.
Figure 4:
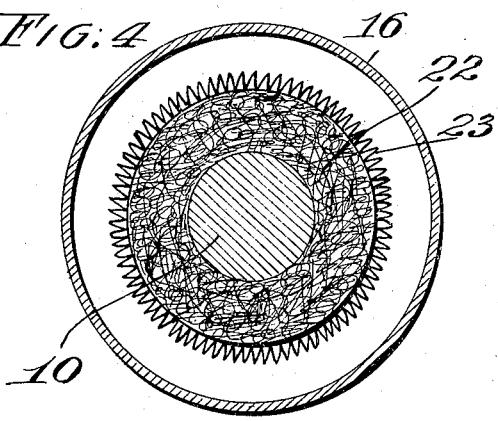
Fig. 4 is a cross section taken on the line 4—4 of Fig. 2.
Figure 5:
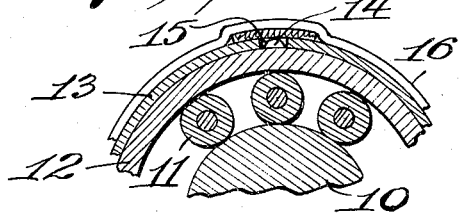
Fig. 5 is a cross section taken on the line 5—5 of Fig. 2.

Referring by numerals to the accompanying drawings which illustrate a practical embodiment of my invention, 10 designates a shaft or spindle that is journaled in a roller bearing 11 and which latter is contained in a bearing ring 12. This bearing ring is enclosed in a sleeve 13 and the latter is retained on said ring by a small lug 14 that enters an aperture 15 in said sleeve.

The grease retaining device contemplated by my invention includes a cap or cup shaped member 16 that fits on the outer end of sleeve 13 and being secured thereto by the clamping action of a screw bolt 17 that passes through perforated ears 18, and the latter being stamped from the annular wall of the cap.

Formed in the center of the wall of the cap 16 is an aperture 19 that receives the projecting portion of the shaft or spindle. A portion of the annular wall of cap 16 is pressed outwardly to form a shallow pocket 20 that receives a piece of felt 21 or analogous material, the latter being positioned over the aperture 15 and serving to prevent the seepage of any grease outwardly through said aperture. Arranged against the inner face of the wall of cap 16 and around the opening 19 therein is a ring 22 of felt or analogous material, said ring encircling the shaft or spindle 10 and being constantly urged or pressed radially inward against the shaft or spindle by an endless coiled spring 23 that bears directly upon the outer edge or periphery of said felt ring.

Encircling the spindle and bearing directly against the felt ring 22 is a disc or washer 24 of chrome leather, the edge portion 25 of which is reduced in thickness.

The edge of the opening in this leather washer fits snugly against the shaft or spindle. Bearing against the leather washer is a metal disc 26, the marginal portion of which is offset to form a flange 27 that bears directly against the relatively thin portion 25 of leather disc 24. This disc 26 is retained in position within the cap by forming two or more indentations such as 28 in the cap 16 and which indentations are located immediately behind the flange 27.

Fitting snugly within the cap between the flange 27 and the ends of the ring 12 and sleeve 13 is a ring 29 of felt or analogous material.

In service this felt ring effectually prevents the leakage of grease outwardly between the cap 16 and the sleeve 13 and as heretofore stated the section of felt 21 prevents seepage of grease outwardly through opening 15. Felt ring 22 prevents leaking of grease outwardly through opening 19 in the cap and the leather disc 24 cooperates with said ring 22 in preventing such outward leakage.

Ring 22 is constantly pressed against the shaft or spindle by the encircling coil spring 23.

A grease retaining device of my improved construction is simple, practical, durable, may be easily applied for use and is very effective in performing its intended functions.

I claim as my invention:

1. In a grease retainer for journal bearings, a container adapted to be positioned upon a bearing, a fibrous ring within said container and adapted to encircle the shaft in the bearing, a coil spring encircling said fibrous ring, a leather disc within the container adjacent to the fibrous ring, a metal disc bearing against said leather disc and a ring of fibrous material between the edge of said metal disc and the bearing to which the container is applied.

2. In a grease retainer for journal bearings, a cup-shaped container fitted on the end of the bearing and provided with an opening in its end wall through which the journal extends, a fibrous ring fitted on said journal within said container and resting against the end wall thereof, and closing the opening therein, a leather ring fitted on said journal within said container and bearing against said fibrous ring, and a metal disk ring surrounding said journal between said leather ring, and the end of said bearing for retaining said leather ring and said fibrous ring in position.

3. In a grease retainer for journal bearings, a cup-shaped container fitted on the end of the bearing and provided with an opening in its end wall through which the journal extends, a fibrous ring fitted on said journal within said container and bearing against the end wall of said container, and closing the opening therein, a leather ring fitted on said journal against the inner side of said fibrous ring, and means engaging said leather ring and holding said ring and said fibrous ring in position.

GEORGE A. BOYER.